United States Patent
Chapman et al.

(10) Patent No.: US 11,005,517 B2
(45) Date of Patent: May 11, 2021

(54) HANDLING OF UNWANTED EMISSIONS FROM A RADIO COMMUNICATIONS DEVICE

(71) Applicant: Telefonaktiebolaget LM Ericsson (publ), Stockholm (SE)

(72) Inventors: Thomas Chapman, Solna (SE); Farshid Ghasemzadeh, Sollentuna (SE); Ulf Gustavsson, Gothenburg (SE); Leonard Rexberg, Hässelby (SE)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 209 days.

(21) Appl. No.: 16/331,030

(22) PCT Filed: Sep. 7, 2016

(86) PCT No.: PCT/EP2016/071052
§ 371 (c)(1),
(2) Date: Mar. 6, 2019

(87) PCT Pub. No.: WO2018/046080
PCT Pub. Date: Mar. 15, 2018

(65) Prior Publication Data
US 2019/0222250 A1 Jul. 18, 2019

(51) Int. Cl.
*H04B 1/04* (2006.01)
*H04B 1/403* (2015.01)
(Continued)

(52) U.S. Cl.
CPC .............. *H04B 1/406* (2013.01); *H04B 1/04* (2013.01); *H04B 1/525* (2013.01); *H04B 15/00* (2013.01); *H04B 2001/0408* (2013.01)

(58) Field of Classification Search
CPC .... H04B 10/25891; H04B 1/04; H04B 1/406; H04B 1/525; H04B 15/00; H04B 2001/0408
See application file for complete search history.

(56) References Cited

U.S. PATENT DOCUMENTS

| | | | |
|---|---|---|---|
| 2006/0068710 A1 | 3/2006 | Jensen | |
| 2014/0106691 A1 | 4/2014 | Chapman et al. | |
| 2015/0071639 A1* | 3/2015 | Stone | H04J 14/0227 398/79 |

FOREIGN PATENT DOCUMENTS

| | | |
|---|---|---|
| EP | 2 224 609 A1 | 9/2010 |
| WO | 2014/053508 A1 | 4/2014 |

(Continued)

OTHER PUBLICATIONS

International Search Report and Written Opinion issued in International Application No. PCT/EP2016/071052, dated Jun. 1, 2017, 10 pages.

(Continued)

*Primary Examiner* — Rahel Guarino
(74) *Attorney, Agent, or Firm* — Patent Portfolio Builders, PLLC (57) ABSTRACT

There is provided mechanisms for transmitting adjusted signals. A method is performed by a radio communications device comprising at least two radio transmitter units. The method comprises generating a signal to be transmitted by the radio transmitter units. The method comprises adjusting the signal at at least one of the radio transmitter units by dithering at least one radio parameter value such that the signals from all radio transmitter units are mutually different. The method comprises transmitting the adjusted signal by the radio transmitter units.

15 Claims, 4 Drawing Sheets

(51) Int. Cl.
*H04B 1/525* (2015.01)
*H04B 15/00* (2006.01)

(56) References Cited

FOREIGN PATENT DOCUMENTS

| WO | 2015/188894 A1 | 12/2015 |
| WO | 2016/039668 A2 | 3/2016 |
| WO | 2016/045724 A1 | 3/2016 |
| WO | 2016/082871 A1 | 6/2016 |

OTHER PUBLICATIONS

3GPP TS 37.105, V13.0.0 (Jun. 2016), 3rd Generation Partnership Project; Technical Specification Group Radio Access Network; Active Antenna System (AAS) Base Station (BS) transmission and reception (Release 13), Mar. 2016, 68 pages.

* cited by examiner

HANDLING OF UNWANTED EMISSIONS FROM A RADIO COMMUNICATIONS DEVICE

CROSS REFERENCE TO RELATED APPLICATION(S)

This application is a 35 U.S.C. § 371 National Stage of International Patent Application No. PCT/EP2016/071052, filed Sep. 7, 2016, designating the United States.

TECHNICAL FIELD

Embodiments presented herein relate to a method, a radio communications device, a computer program, and a computer program product for transmitting adjusted signals.

BACKGROUND

In general terms, transmissions from radio communications devices, such as base stations and terminal devices, aim to radiate energy within a permitted frequency allocation. However, it is in most cases unavoidable that energy is also transmitted at frequencies other than the permitted allocation. Such frequencies could have been allocated for use by other communications systems. Leakage of radiated energy to non-allocated frequencies is termed unwanted emissions. Although unwanted emissions are unavoidable, the amount of unwanted emissions should be kept to a small level in order to avoid disruptive interference to the other communications systems.

Regulations and telecommunication standards for base stations and terminal devices include limits on the amount of unwanted emissions that the radio communications devices are allowed to produce. The radio communications devices must be tested and demonstrated not to exceed the unwanted emissions limits to be legal and type approved.

Many unwanted emissions limits are specified at the output of the radio transmitter of the radio communications devices and are known as conducted emissions limits. The emissions levels are tested by means of disconnecting the antenna from the radio communications device and instead connecting the radio communications device to test equipment that is able to measure the unwanted emissions levels. In general terms, as long as the disconnected antenna equipment does not contain any active or non-linear components, then the total emissions power radiated in all directions from the antenna during real operation will be lower than the unwanted emissions level measured with the test gear. Thus meeting the emissions limit with the test gear demonstrates that when radiating in real operation, unwanted emissions levels will also not be exceeded.

In addition to unwanted emissions, nonlinearities in the transmitters can give rise to distortions of the wanted signal. These distortions can be viewed as another source of emissions, this time within the same frequency range as the wanted signal. Typically, the level of interference to the wanted signal caused by self-induced distortions is captured by a metric known as EVM (Error Vector Measure).

For future radio communications devices having active antenna systems (AAS) that have a large number of transmitters in order to achieve a high directivity, if emissions are correlated between transmitters then there could be a large "antenna gain" for the emissions. In order to meet unwanted emissions limits, the power of the transmitters would need to be significantly reduced to compensate for the beamforming, or antenna gain if the unwanted emissions are defined as Equivalent Isotropic Radiated Power (EIRP). Alternatively, sophisticated linearization schemes with high complexity could be used to additionally reduce unwanted emissions to compensate for the antenna gain present in the EIRP of the unwanted emissions. Using such sophisticated linearization schemes to meet requirements could increase the cost and complexity of beamforming to the point where it would not be feasible to use it.

Furthermore the direction of maximum (EIRP) of the unwanted emissions for an AAS may not be aligned with the direction of the wanted signal and may not be easily predictable. Attempting to find the maximum EIRP may require a lot of measurements and measurement time. Furthermore, the direction of maximum EIRP may change with time due to scheduling decisions.

In view of the above, there is still a need for an improved handling of unwanted emissions from a radio communications device.

SUMMARY

An object of embodiments herein is to provide efficient handling of unwanted emissions from a radio communications device.

According to a first aspect there is presented a method for transmitting adjusted signals. The method is performed by a radio communications device comprising at least two radio transmitter units. The method comprises generating a signal to be transmitted by the radio transmitter units. The method comprises adjusting the signal at at least one of the radio transmitter units by dithering at least one radio parameter value such that the signals from all radio transmitter units are mutually different. The method comprises transmitting the adjusted signal by the radio transmitter units.

Advantageously this provides an efficient way to adjust signals to be transmitted by the radio communications device. In turn the transmission of adjusted signals enables efficient handling of unwanted emissions from the radio communications device whereby the negative the effects caused by unwanted emissions are reduced.

Advantageously, adjusting the signals to be transmitted could de-correlate the unwanted emissions between radio transmitter units, which in turn would remove directivity and reduce the EIRP of the emissions. This will allow EIRP based unwanted emissions requirements to be met whilst not needing to reduce the power and directivity of the wanted signal and nor needing to use complex linearization schemes to compensate the possible antenna gain. This will enable design of high degrees of beamforming, which could give significant increases in system capacity and network coverage.

According to a second aspect there is presented a radio communications device for transmitting adjusted signals. The radio communications device comprises at least two radio transmitter units. The radio communications device further comprising processing circuitry. The processing circuitry is configured to cause the radio communications device to generate a signal to be transmitted by the radio transmitter units. The processing circuitry is configured to cause the radio communications device to adjust the signal at at least one of the radio transmitter units by dithering at least one radio parameter value such that the signals from all radio transmitter units are mutually different. The processing circuitry is configured to cause the radio communications device to transmit the adjusted signal by the radio transmitter units.

According to a third aspect there is presented a radio communications device for transmitting adjusted signals. The radio communications device comprises at least two radio transmitter units. The radio communications device further comprises processing circuitry and a computer program product. The computer program product stores instructions that, when executed by the processing circuitry, causes the radio communications device to perform operations, or steps. The operations, or steps, cause the radio communications device to generate a signal to be transmitted by the radio transmitter units. The operations, or steps, cause the radio communications device to adjust the signal at at least one of the radio transmitter units by dithering at least one radio parameter value such that the signals from all radio transmitter units are mutually different. The operations, or steps, cause the radio communications device to transmit the adjusted signal by the radio transmitter units.

According to a third aspect there is presented a radio communications device for transmitting adjusted signals. The radio communications device comprises at least two radio transmitter units. The radio communications device further comprises a generate module configured to generate a signal to be transmitted by the radio transmitter units. The radio communications device further comprises an adjust module configured to adjust the signal at at least one of the radio transmitter units by dithering at least one radio parameter value such that the signals from all radio transmitter units are mutually different. The radio communications device further comprises a transmit module configured to cause the adjusted signal to be transmitted by the radio transmitter units.

According to a fifth aspect there is presented a computer program for transmitting adjusted signals, the computer program comprising computer program code which, when run on a radio communications device, causes the radio communications device to perform a method according to the first aspect.

According to a sixth aspect there is presented a computer program product comprising a computer program according to the fifth aspect and a computer readable storage medium on which the computer program is stored. The computer readable storage medium could be a non-transitory computer readable storage medium.

It is to be noted that any feature of the first, second, third, fourth, fifth and sixth aspects may be applied to any other aspect, wherever appropriate. Likewise, any advantage of the first aspect may equally apply to the second, third, fourth, fifth and/or sixth aspect, respectively, and vice versa. Other objectives, features and advantages of the enclosed embodiments will be apparent from the following detailed disclosure, from the attached dependent claims as well as from the drawings.

Generally, all terms used in the claims are to be interpreted according to their ordinary meaning in the technical field, unless explicitly defined otherwise herein. All references to "a/an/the element, apparatus, component, means, step, etc." are to be interpreted openly as referring to at least one instance of the element, apparatus, component, means, step, etc., unless explicitly stated otherwise. The steps of any method disclosed herein do not have to be performed in the exact order disclosed, unless explicitly stated.

BRIEF DESCRIPTION OF THE DRAWINGS

The inventive concept is now described, by way of example, with reference to the accompanying drawings, in which.

DETAILED DESCRIPTION

The inventive concept will now be described more fully hereinafter with reference to the accompanying drawings, in which certain embodiments of the inventive concept are shown. This inventive concept may, however, be embodied in many different forms and should not be construed as limited to the embodiments set forth herein; rather, these embodiments are provided by way of example so that this disclosure will be thorough and complete, and will fully convey the scope of the inventive concept to those skilled in the art. Like numbers refer to like elements throughout the description. Any step or feature illustrated by dashed lines should be regarded as optional.

Figure 1:
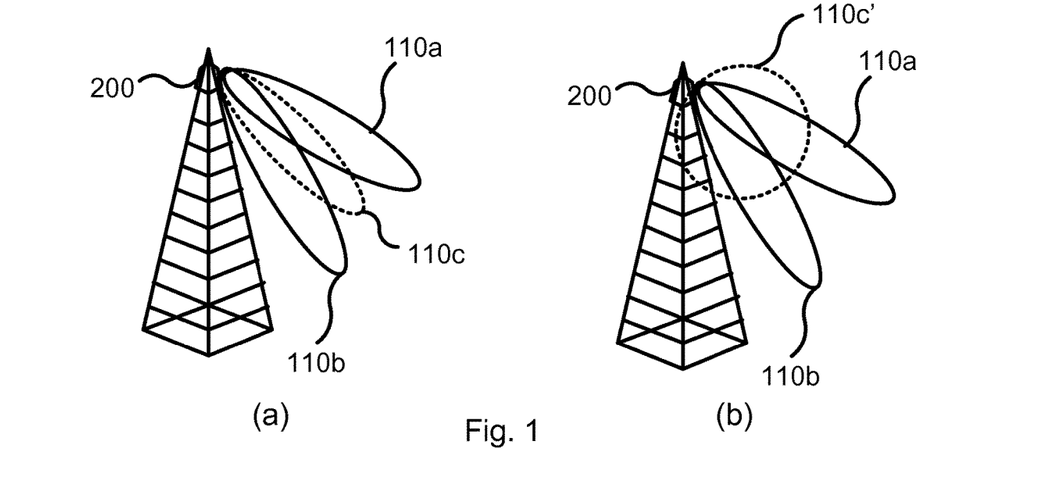
FIG. 1 is a schematic diagram illustrating a communication network according to embodiments.

FIG. 1 is a schematic diagram illustrating at (a) and (b) a communications network comprising a radio communications device 200 where embodiments presented herein can be applied. As illustrated in FIG. 1 the radio communications device 200 could be, or at least be co-located with, a radio base station, such as a radio access network node, a base transceiver station, a node B, an evolved node B, or a remote radio unit. However, alternatively, the herein disclosed radio communications device 200 could be, or at least be co-located with, a terminal device, such as a portable wireless communications device, a mobile station, a mobile phone, a handset, a wireless local loop phone, a user equipment (UE), a smartphone, a laptop computer, a tablet computer, a repeater, or a wireless modem. At 110a, 110b, 110c, 110c' are illustrated transmission beams as used by the radio communications device 200 to transmit signals. In this respect, transmission beams 110a, 110b represent wanted signals whereas transmission beams 110c, 110c' represent unwanted transmission beams.

The radio communications device 200 could thus be configured for beamforming. However, both radio communications devices 200 equipped with conventional antenna systems and radio communications devices 200 equipped with AAS, the wanted signal is not transmitted omni-directionally. In general terms, a radio communications device 200 equipped with conventional antenna systems and acting as a base station is likely to transmit the wanted signals with a beam intended to cover a region (cell) area, typically 60-120 degrees wide in azimuth and 8-10 degrees in elevation for a so-called macro base station, thus resulting in passive beamforming. Since this passive beamforming is based on linear and passive components in the radio communications device 200, the unwanted emissions will experience the same beam pattern as the wanted signal within the antenna bandwidth. For frequencies outside of the antenna bandwidth, the unwanted emissions beam pattern will be somewhat attenuated and distorted.

Radio communications devices 200 equipped with AAS may transmit in multiple transmission beams. One source of unwanted emissions can be intermodulation between different frequencies within the transmitted signal. If the different frequencies are transmitted with different beam patterns, then the resulting unwanted transmission beam will be a product of the beam patterns. In this way, the spatial pattern of the unwanted transmission beam may differ from that of the wanted signals, as for transmission beams 110c at (a) in FIG. 1.

Furthermore, for some unwanted emissions the contents of the unwanted emissions may be uncorrelated between different radio transmitter units of the radio communications device 200. If the unwanted emissions are uncorrelated, then they will not experience beamforming at all and will be radiated with the spatial pattern of the individual radiating antenna elements, which is typically wide, as for transmission beams 110c' at (b) in FIG. 1.

In general terms, the level of correlation between unwanted emissions between radio transmitter units is typically higher for frequencies close to the wanted signal (hence at these frequencies, a spatial pattern of emissions is more likely to be observed) and lower at frequencies that are quite different to the wanted signal.

In most circumstances, the spatial pattern of the unwanted emissions is of low importance because it is the total power of the emitted signal that causes interference to other communications systems rather than its specific direction. In certain cases, the direction in which the unwanted emissions have highest power may be of relevance.

Figure 2:
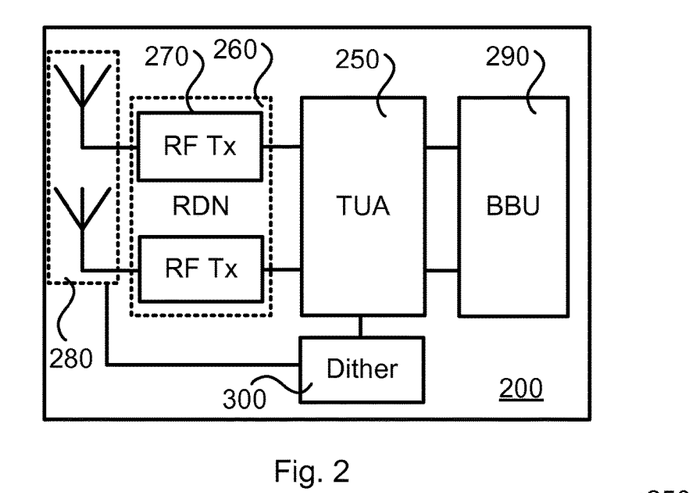
FIG. 2 schematically illustrates components of a radio communications device according to an embodiment.

FIG. 2 schematically illustrates a reference architecture for a radio communications device 200 according to an embodiment. The radio communications device 200 comprises and antenna array 280, a radio distribution network (RDN) 260, a transceiver unit array (TUA) comprising radio transmitter units 250 and a baseband processing unit (BBU) 290. In turn the radio distribution network 260 comprises radio frequency (RF) transmitter (Tx) units 270. The baseband processing unit 290 can be configured to perform user-specific transmission and reception beamforming. Although a logical part of the radio communications device 200, the baseband processing unit 290 may not be physically co-located with the other components 250, 260, 270, 280 of the radio communications device 200. The transceiver unit array comprises active circuits, forming the radio transmitter units 250, that perform actions such as signal conditioning/processing, amplification and filtering. There may be unequally many transmitters and receivers and the transmitters and receivers may be implemented as single modules or separately. The radio distribution network 260 distributes transmission signals between the transceiver unit array and transmit antenna elements of the antenna array 280 and receiver signals between receive antenna elements of the antenna array 280 and the transceiver unit array. The radio distribution network 260 may comprise components for splitting and combining of signals. The antenna array 280 comprises a group of radiating antenna elements. The radiating antenna elements may be for transmission only, for reception only, or for both to transmission and reception. Signals to be transmitted are thus fed into the transceiver unit array from the baseband processing unit 290 and then via the radio distribution network 260 to the antenna array 280. The radio communications device 200 further comprises a radio parameter dithering unit 300. The radio parameter dithering unit 300 is configured to determine dithered radio parameter values for the radio transmitter units 250 in the transceiver unit array. How to perform such dithering will be disclosed below.

Figure 3:
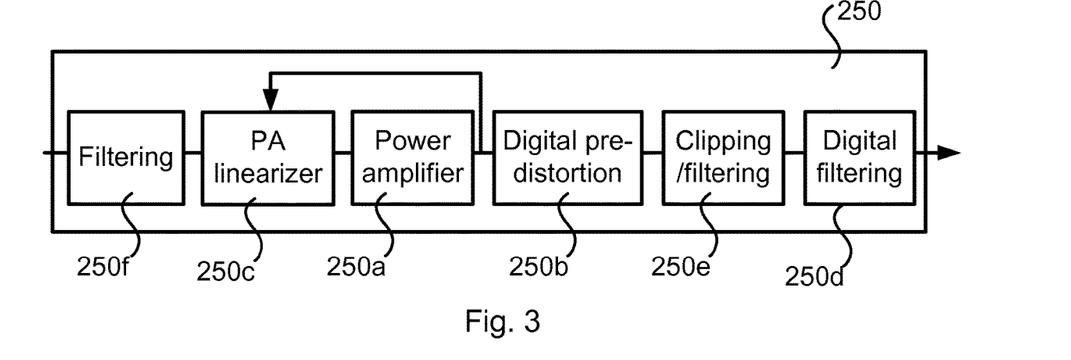
FIG. 3 schematically illustrates a radio transmitter unit of the radio communications device in FIG. 2 according to an embodiment.

FIG. 3 schematically illustrates one radio transmitter unit 250 in more detail. The radio transmitter unit 250 comprise at least a digital filter 250d, a clipping and filtering unit 250e configured to apply so-called clipping and filtering to the input signal in order to create more favorable Peak-to-Average Power Ratio (PAPR) properties, a digital pre-distorter (DPD) 250b, a power amplifier (PA) 250a that is controlled by means of a bias point, a PA linearizer 250c that receives feedback from the PA 250a, and a further filter 250f. Optionally, the functionality of the PA linearizer 250c is performed by the DPD 250b and such an implementation would not require a separate PA linearizer 250c. Optionally, the radio transmitter unit 250 includes a coupler configured to provide feedback to a measurement unit (for example co-located with the radio parameter dithering unit 300) which in turn is configured to measure the amount of unwanted emissions.

The embodiments disclosed herein relate to mechanisms for transmitting adjusted signals. In order to obtain such mechanisms there is provided a radio communications device 200, a method performed by the radio communications device 200, a computer program product comprising code, for example in the form of a computer program, that when run on a radio communications device 200, causes the radio communications device 200 to perform the method.

Figure 4:
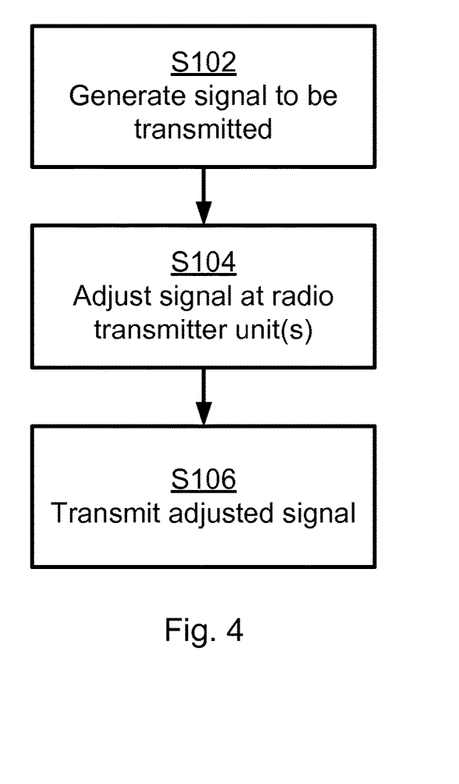
FIGS. 4, 5, and 6 are flowcharts of methods according to embodiments.
Figure 5:
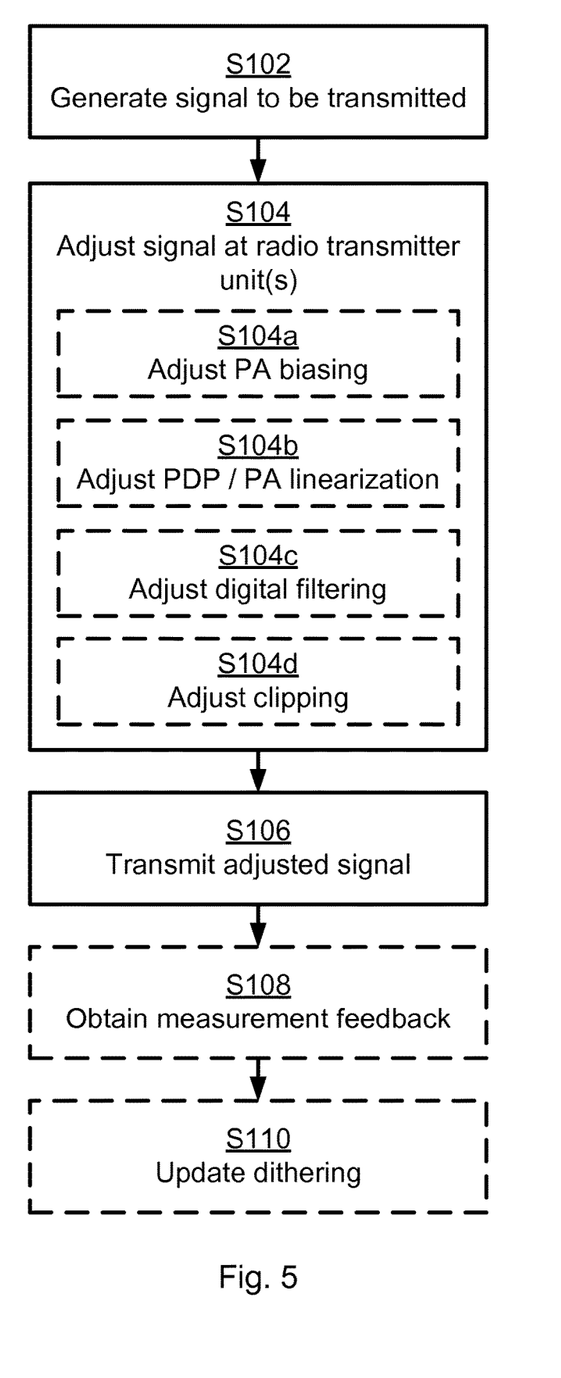
Figure 6:
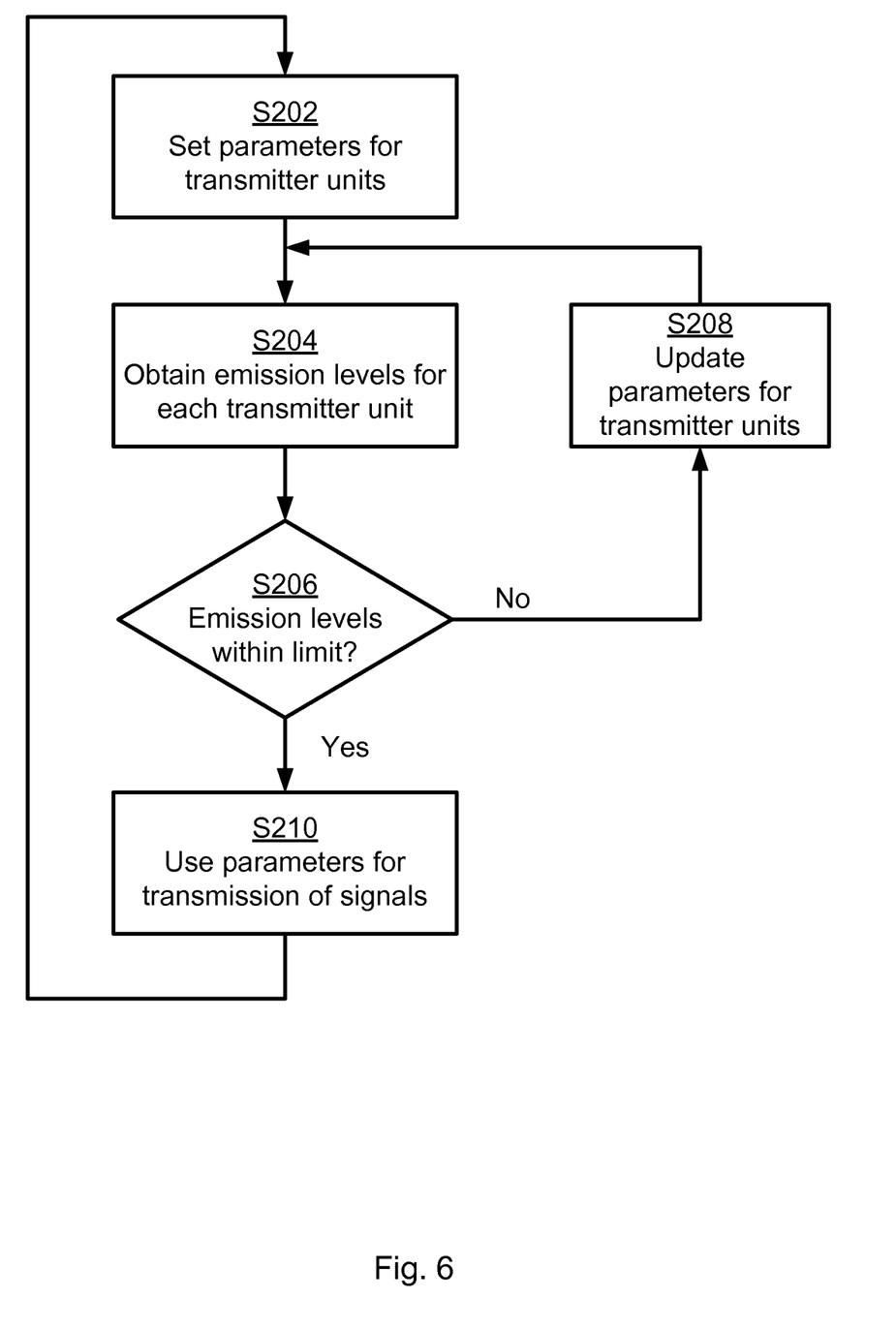

FIGS. 4, 5, and 6 are flow charts illustrating embodiments of methods for transmitting adjusted signals. The methods are performed by the radio communications device 200. The methods are advantageously provided as computer programs 920.

Reference is now made to FIG. 4 illustrating a method for transmitting adjusted signals as performed by the radio communications device 200 according to an embodiment. The radio communications device 200 comprises at least two radio transmitter units 250.

S102: The radio communications device 200 generates a signal to be transmitted by the radio transmitter units 250.

To resolve the issues indicated above, the transmissions of the radio communications device 200 are determined such that beamforming of the unwanted emissions is avoided, without affecting the transmissions (and beamforming) of the wanted signals. Beamforming can, for example, be avoided if the unwanted emissions are uncorrelated between the radio transmitter units 250 of the radio communications device 200, which may not be the case for frequencies close to the carrier frequency of the wanted signals. De-correlation of the unwanted emissions can be achieved by adjusting the signal to be transmitted at at least one of the radio transmitter units 250. Hence the radio communications device 200 is configured to perform step S104:

S104: The radio communications device 200 adjusts the signal at at least one of the radio transmitter units 250. The signal is adjusted by the radio communications device 200 dithering at least one radio parameter value such that the signals from all radio transmitter units 250 are mutually different.

In the illustrative example of FIG. 1, the adjusting in step S104 could cause the transmission beam 110c (which would otherwise exist) to be reshaped into transmission beam 110c'. The adjusting in step S104 could be implemented by the radio parameter dithering unit 300. Once the signal at at least one of the radio transmitter units 250 has been adjusted the radio communications device 200 transmits the thus adjusted signal. Hence the radio communications device 200 is configured to perform step S106:

S106: The radio communications device 200 transmits the adjusted signal by the radio transmitter units 250.

Embodiments relating to further details of transmitting adjusted signals as performed by the radio communications device 200 will now be disclosed.

The adjusting of the signal can be carried out such that the total amount of emissions is not increased and that the unwanted emissions become uncorrelated between the radio transmitter units 250 whilst the wanted signal remains correlated between the radio transmitter units 250. Hence, according to an embodiment the signal gives rise to correlated unwanted signal contributions when transmitted unadjusted by the transmitter units 250, and the signal is adjusted to de-correlate the unwanted signal contributions. In this regard, the term correlated signals should be interpreted as the signals having a Pearson product-moment correlation coefficient $\rho$, where $1 > |\rho| > 0$. Further in this respect, the signal is adjusted to de-correlate the unwanted signal contributions such that the signals are de-correlated between different transmitter units 250. The level of decorrelation can be based on emission level criteria. Hence, according to an embodiment the signal is adjusted until it satisfies an emission level criterion for the unwanted signal contributions. In this respect the decorrelation does not need to be performed such that $\pi = 0$.

Reference is now made to FIG. 5 illustrating methods for transmitting adjusted signals as performed by the radio communications device 200 according to further embodiments. It is assumed that steps S102, S104, S106 are performed as described above with reference to FIG. 4 and a thus repeated description thereof is therefore omitted.

There may be different ways for the radio communications device 200 to adjust the signal at at least one of the radio transmitter units 250. Different embodiments relating thereto will now be described in turn.

According to a first example adjustment of the signal is achieved by adjusting the Power Amplifier (PA) bias differently at different radio transmitter units 250. Hence, according to an embodiment each radio transmitter unit 250 comprises a power amplifier 250a, and wherein the radio communications to device 200 is configured to adjust the signal by performing step S104a:

S104a: The radio communications device 200 adjusts power amplifier bias such that the power amplifiers 250a of the radio transmitter units 250 have mutually different radio parameter values.

If the PA bias is adjusted differently, then the linearity of the PAs will differ. This may lead to higher absolute levels of unwanted emissions at some PAs and lower absolute levels at other PAs. Since unwanted emissions levels depend on the combined output of all PAs, the higher levels at some PAs can be compensated by lower levels at others. With different bias points the nonlinearities that cause unwanted emissions will differ and not be correlated in phase. Changing the bias point changes the non-linear behavior of the PAs and the correlation of intermodulation distortions between the radio transmitter units 250. At some PAs, changing the bias points leads to the unwanted emissions levels increasing. This is compensated by the unwanted emissions levels decreasing at other PAs for which the bias point has been set differently. Hence, the radio communications device 200 could set the radio parameter value in such a manner that the total unwanted emissions from all radio transmitter units 250 remains at the same level even though the unwanted emissions is increased at some radio transmitter units 250 and decreased at other radio transmitter units 250.

According to a second example adjustment of the signal is achieved by varying some parameters of the DPD or the PA linearization. Hence, according to an embodiment each radio transmitter unit 250 comprises a digital pre-distorter 250b and/or a power amplifier linearizer 250c, and wherein the radio communications device 200 is configured to adjust the signal by performing step S104b:

S104b: The radio communications device 200 adjusts at least one of digital pre-distortion and/or power amplifier linearization such that the digital pre-distorters 250b and/or power amplifier linearizers 250c of the radio to transmitter units 250 have mutually different radio parameter values.

In this respect the digital pre-distorters 250b and/or power amplifier linearizers 250c of the radio transmitter units 250 have mutually different radio parameter values that give rise to different unwanted outputs but still correlated wanted signals.

By varying parameters of the digital pre-distorters 250b and/or power amplifier linearizers 250, the nature of the filtering and the correlation level of the emissions can be disrupted. Again, this may lead to increases in emissions in some transmitter units 250 and decreases for other transmitter units 250.

The parameters of the digital pre-distorters 250b and/or power amplifier linearizers 250 could be varied such that the phase and/or amplitude of the unwanted emissions at the output of each the radio transmitter units 250 differs. The parameters of the digital pre-distorters 250b and/or power amplifier linearizers 250 could be varied to allow larger levels of emissions at some radio transmitter units 250 and levels that are lower at other radio transmitter units 250.

According to a third example adjustment of the signal is achieved by deviating the parameters of any digital filtering prior to analog to digital conversion. Hence, according to an embodiment each radio transmitter unit 250 comprises a digital filter 250d, and wherein the radio communications device 200 is configured to adjust the signal by performing step S104c:

S104c: The radio communications device 200 adjusts digital filtering such that the digital filters 250d of the radio transmitter units 250 have mutually different radio parameter values.

This gives the opportunity to alter the parameters of the filtering in order to disrupt any coherency of some unwanted emissions. The filtering could preserve the phase response for the wanted signal in the in-band frequency region, whilst deviating the phase response in the out-of-band frequency region. The digital filtering is using a digital filter with substantially similar in-band filter response but uncorrelated out-of-band response.

According to a fourth example adjustment of the signal is achieved by changing the amount of clipping applied at each of the different transmitter units 250. Hence, according to an embodiment each radio transmitter unit 250 comprises a clipping unit 250e, and wherein the radio communications device 200 is configured to adjust the signal by performing step S104d:

S104d: The radio communications device 200 adjusts clipping applied to at least one of the radio transmitter units 250 such that the clipping units 250e of the radio transmitter units 250 have mutually different radio parameter values.

According to a fifth example adjustment of the signal is achieved by any combination of the above disclosed first, second, third, and fourth examples.

There may be different ways of applying the adjustments to the radio transmitter units 250. For example, some or all adjustments of the above disclosed first, second, third, and fourth examples could be applied at each radio transmitter unit 250. Hence, according to an embodiment at least one of adjusting power amplifier bias, adjusting at least one of digital pre-distortion and/or power amplifier linearization, adjusting digital filtering, and adjusting clipping is applied to all of the radio transmitter units 250.

Alternatively, the radio transmitter units 250 are subdivided into groups of radio transmitter units and the adjustments are applied differently to different groups. Hence, according to an embodiment the radio transmitter units 250 are divided into at least two groups of radio transmitter units 250, and mutually different adjusting of the radio parameter values is performed for each of the groups.

The radio communications device 200 could be configured to balance the unwanted emissions levels between radio transmitter units 250 by performing the adjusting in step S104 either by means of having prior knowledge of the characteristics of the radio transmitter units 250 and calculating the impact of changes parameters on the unwanted emissions levels, or by means of obtaining measurement feedback on the unwanted emissions. Hence, according to an embodiment the radio communications device 200 is configured to perform step S108:

S108: The radio communications device 200 obtains measurement feedback of the correlated unwanted signal contributions. The dithering of the radio parameter values is updated based on the measurement feedback.

According to an embodiment the dithering of the radio parameter values are based on pre-stored dithering values.

Obtaining measurement feedback and/or using pre-stored dithering values could ensure that the total unwanted emissions from all radio transmitter units 250 remain the same as it would be without the dithering.

In any of the above disclosed embodiments the radio parameter values may be changed from time to time. Hence, according to an embodiment the radio communications device 200 is configured to perform step S110:

S110: The radio communications device 200 updates the dithering of the radio parameter values.

One reason for updates the dithering of the radio parameter values could be that at certain times, multiple uncorrelated signals are transmitted leading to uncorrelated unwanted emissions without the need for parameter dithering, whereas at other times, correlated signals may be transmitted over a period of time that, without the dithering, would give rise to correlated, and thus beamformed, unwanted emissions. Further, the dithering may be selectively switched on and off. Particularly, according to an embodiment the adjusting of the signal in step S104 is selectively switched on and off depending on the number of transmission beams used to transmit the signal. Thereby, during the periods of time at which dithering of the parameters is not required, for example the PA bias point and the DPD parameters could be set in order to fulfil other objectives, such as maximising PA efficiency.

Reference is now made to FIG. 6 illustrating a method for adjusting signals as performed by the radio communications device 200 based on at least some of the above disclosed embodiments.

S202: The radio communications device 200 sets (initial) radio parameter values for the radio transmitter units 250. One way to implement step S202 is to perform step S102.

S204: The radio communications device 200 obtain emission levels for each radio transmitter units 250 for the used radio parameter values. One way to implement step S204 is to perform step S108.

S206: The radio communications device 200 checks if the emission levels of the unwanted emissions are within a limit. If no, then step S208 is entered, and if yes then step S210 is entered.

S208: The radio communications device 200 dithers the radio parameter values for at least one of the radio transmitter units 250. Step S204 is then entered again. One way to implement step S208 is to perform any of step S104 and step S110.

S210: The radio communications device 200 uses the radio parameter values for transmission of signals. Step S202 could then be entered again. One way to implement step S210 is to perform step S108.

Figure 7:
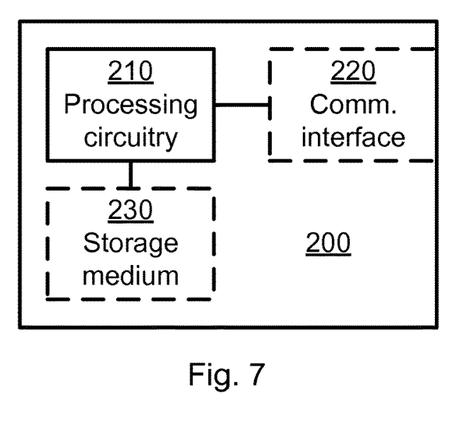
FIG. 7 is a schematic diagram showing functional units of a radio communications device according to an embodiment.

FIG. 7 schematically illustrates, in terms of a number of functional units, the components of a radio communications device 200 according to an embodiment. Processing circuitry 210 is provided using any combination of one or more of a suitable central processing unit (CPU), multiprocessor, microcontroller, digital signal processor (DSP), etc., capable of executing software instructions stored in a computer program product 910 (as in FIG. 9), e.g. in the form of a storage medium 230. The processing circuitry 210 may further be provided as at least one application specific integrated circuit (ASIC), or field programmable gate array (FPGA).

Particularly, the processing circuitry 210 is configured to cause the radio communications device 200 to perform a set of operations, or steps, S102-S110, S202-S210, as disclosed above. For example, the storage medium 230 may store the set of operations, and the processing circuitry 210 may be configured to retrieve the set of operations from the storage medium 230 to cause the radio communications device 200 to perform the set of operations. The set of operations may be provided as a set of executable instructions.

Thus the processing circuitry 210 is thereby arranged to execute methods as herein disclosed. The storage medium 230 may also comprise persistent storage, which, for example, can be any single one or combination of magnetic memory, optical memory, solid state memory or even remotely mounted memory. The radio communications device 200 may further comprise a communications interface 220 at least configured for transmission of adjusted (and unadjusted) signals. As such the communications interface 220 may comprise one or more transmitters and receivers, comprising analogue and digital components. The processing circuitry 210 controls the general operation of the radio communications device 200 e.g. by sending data and control signals to the communications interface 220 and the storage medium 230, by receiving data and reports from the communications interface 220, and by retrieving data and instructions from the storage medium 230. Other components, as well as the related functionality, of the radio communications device 200 are omitted in order not to obscure the concepts presented herein.

Figure 8:
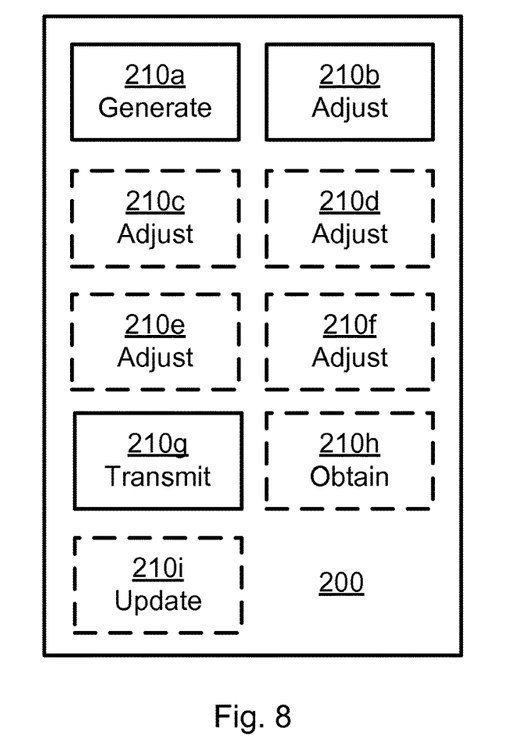
FIG. 8 is a schematic diagram showing functional modules of a radio communications device according to an embodiment.

FIG. 8 schematically illustrates, in terms of a number of functional modules, the components of a radio communications device 200 according to an embodiment. The radio communications device 200 of FIG. 8 comprises a number of functional modules; a generate module 210a configured to perform step S102, an adjust module 210b configured to perform step S104, and a transmit module 210g configured to perform step S106. The radio communications device 200 of FIG. 8 may further comprises a number of optional functional modules, such as any of an adjust module 210c configured to perform step S104a, an adjust module 210d configured to perform step S104b, an adjust module 210e configured to perform step S104c, an adjust module 210f configured to perform step S104d, an obtain module 210h configured to perform step S108, and an update module 210i configured to perform step S110. In general terms, each functional module 210a-210i may in one embodiment be implemented only in hardware or and in another embodiment with the help of software, i.e., the latter embodiment having computer program instructions stored on the storage medium 230 which when run on the processing circuitry makes the radio communications device 200 perform the corresponding steps mentioned above in conjunction with FIG. 8. It should also be mentioned that even though the modules correspond to parts of a computer program, they do not need to be separate modules therein, but the way in which they are implemented in software is dependent on the programming language used. Preferably, one or more or all functional modules 210a-210i may be implemented by the processing circuitry 210, possibly in cooperation with functional units 220 and/or 230. The processing circuitry 210 may thus be configured to from the storage medium 230 fetch instructions as provided by a functional module 210a-210i and to execute these instructions, thereby performing any steps as disclosed herein.

The radio communications device 200 may be provided as a standalone device or as a part of at least one further device. For example, the radio communications device 200 may be provided at least partly in a node of a radio access network. Alternatively, functionality of the radio communications device 200 may be distributed between at least two devices, or nodes. These at least two nodes, or devices, may either be part of the same network part (such as the radio access network) or may be spread between at least two such network parts. In general terms, instructions that are required to be performed in real time may be performed in a device, or node, operatively closer to the radio access network than instructions that are not required to be performed in real time.

Thus, a first portion of the instructions performed by the radio communications device 200 may be executed in a first device, and a second portion of the of the instructions performed by the radio communications device 200 may be executed in a second device; the herein disclosed embodiments are not limited to any particular number of devices on which the instructions performed by the radio communications device 200 may be executed. Hence, the methods according to the herein disclosed embodiments are suitable to be performed by a radio communications device 200 residing in a cloud computational environment. Therefore, although a single processing circuitry 210 is illustrated in FIG. 7 the processing circuitry 210 may be distributed among a plurality of devices, or nodes. The same applies to the functional modules 210a-210i of FIG. 8 and the computer program 920 of FIG. 9 (see below).

Figure 9:
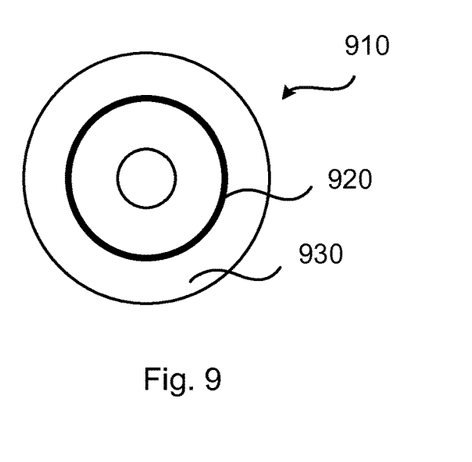
FIG. 9 shows one example of a computer program product comprising computer readable storage medium according to an embodiment.

FIG. 9 shows one example of a computer program product 910 comprising computer readable storage medium 930. On this computer readable storage medium 930, a computer program 920 can be stored, which computer program 920 can cause the processing circuitry 210 and thereto operatively coupled entities and devices, such as the communications interface 220 and the storage medium 230, to execute methods according to embodiments described herein. The computer program 920 and/or computer program product 910 may thus provide means for performing any steps as herein disclosed.

In the example of FIG. 9, the computer program product 910 is illustrated as an optical disc, such as a CD (compact disc) or a DVD (digital versatile disc) or a Blu-Ray disc. The computer program product 910 could also be embodied as a memory, such as a random access memory (RAM), a read-only memory (ROM), an erasable programmable read-only memory (EPROM), or an electrically erasable programmable read-only memory (EEPROM) and more particularly as a non-volatile storage medium of a device in an external memory such as a USB (Universal Serial Bus) memory or a Flash memory, such as a compact Flash memory. Thus, while the computer program 920 is here schematically shown as a track on the depicted optical disk, the computer program 920 can be stored in any way which is suitable for the computer program product 910.

The inventive concept has mainly been described above with reference to a few embodiments. However, as is readily appreciated by a person skilled in the art, other embodiments than the ones disclosed above are equally possible within the scope of the inventive concept, as defined by the appended patent claims.

The invention claimed is:

1. A method for transmitting adjusted signals, the method being performed by a radio communications device comprising at least two radio transmitter units, the method comprising:
   generating a signal to be transmitted by the at least two radio transmitter units;
   adjusting the signal at at least one of the at least two radio transmitter units by dithering at least one radio parameter value such that the signals from all of the at least two radio transmitter units are mutually different; and
   transmitting the adjusted signal by the at least one of the at least two radio transmitter units.

2. The method of claim 1, wherein the signal gives rise to correlated unwanted signal contributions when transmitted unadjusted by the at least two radio transmitter units, and wherein the signal is adjusted to de-correlate the unwanted signal contributions.

3. The method of claim 2, wherein the signal is adjusted until it satisfies an emission level criterion for the unwanted signal contributions.

4. The method of claim 1, wherein each radio transmitter unit of the at least two radio transmitter units comprises a power amplifier, and wherein adjusting the signal comprises:
   adjusting power amplifier bias such that the power amplifiers of the at least two radio transmitter units have mutually different radio parameter values.

5. The method of claim 1, wherein each radio transmitter unit of the at least two radio transmitter units comprises a digital pre-distorter and/or a power amplifier linearizer, and wherein adjusting the signal comprises:
   adjusting at least one of digital pre-distortion and/or power amplifier linearization such that the digital pre-distorters and/or power amplifier linearizers of the at least two radio transmitter units have mutually different radio parameter values.

6. The method of claim 1, wherein each radio transmitter unit of the at least two radio transmitter units comprises a digital filter, and wherein adjusting the signal comprises:
   adjusting digital filtering such that the digital filters of the at least two radio transmitter units have mutually different radio parameter values.

7. The method of claim 1, wherein each radio transmitter unit of the at least two radio transmitter units comprises a clipping unit, and wherein adjusting the signal comprises:

adjusting clipping applied to the at least one of the at least two radio transmitter units such that the clipping units of the at least two radio transmitter units have mutually different radio parameter values.

8. The method of claim 4, wherein at least one of adjusting the power amplifier bias, adjusting at least one of digital pre-distortion and/or power amplifier linearization, adjusting digital filtering, and adjusting clipping is applied to all of the at least two radio transmitter units.

9. The method of claim 1, wherein the at least two radio transmitter units are divided into at least two groups of radio transmitter units, and wherein mutually different adjusting of the radio parameter values is performed for each of the at least two groups.

10. The method of claim 1, further comprising:
updating the dithering of the at least one radio parameter value.

11. The method of claim 2, further comprising:
obtaining measurement feedback of the correlated unwanted signal contributions, wherein the dithering of the at least one radio parameter value is updated based on the measurement feedback.

12. The method of claim 1, wherein the dithering of the at least one radio parameter value is based on pre-stored dithering values.

13. The method of claim 1, wherein adjusting the signal is selectively switched on and off depending on number of transmission beams used to transmit the signal.

14. A radio communications device for transmitting adjusted signals, the radio communications device comprising:

at least two radio transmitter units; and processing circuitry coupled to the at least two radio transmitter units wherein the radio communications device is configured to:

generate a signal to be transmitted by the at least two radio transmitter units;

adjust the signal at at least one of the at least two radio transmitter units by dithering at least one radio parameter value such that the signals from all of the at least two radio transmitter units are mutually different; and transmit the adjusted signal by the at least one of the at least two radio transmitter units.

15. A non-transitory computer readable medium storing a computer program for transmitting adjusted signals, the computer program comprising computer code which, when run on processing circuitry of a radio communications device comprising at least two radio transmitter units, causes the radio communications device to:

generate a signal to be transmitted by the at least two radio transmitter units;

adjust the signal at at least one of the at least two radio transmitter units by dithering at least one radio parameter value such that the signals from all of the at least two radio transmitter units are mutually different; and transmit the adjusted signal by the at least one of the at least two radio transmitter units.

* * * * *